US010778481B1

(12) United States Patent
Glenn

(10) Patent No.: US 10,778,481 B1
(45) Date of Patent: Sep. 15, 2020

(54) ADAPTABLE CAN TRANSCEIVER AND SYSTEM

(71) Applicant: DELPHI TECHNOLOGIES IP LIMITED, St. Michael (BB)

(72) Inventor: Jack L. Glenn, Union Pier, MI (US)

(73) Assignee: DELPHI TECHNOLOGIES IP LIMITED (BB)

( * ) Notice: Subject to any disclaimer, the term of this patent is extended or adjusted under 35 U.S.C. 154(b) by 0 days.

(21) Appl. No.: 16/362,785

(22) Filed: Mar. 25, 2019

(51) Int. Cl.
*H04L 25/49* (2006.01)
*H04L 12/40* (2006.01)
*H04L 7/00* (2006.01)

(52) U.S. Cl.
CPC ........ *H04L 25/4902* (2013.01); *H04L 7/0041* (2013.01); *H04L 12/40013* (2013.01); *H04L 2012/40215* (2013.01)

(58) Field of Classification Search
CPC ............... H04L 25/4902; H04L 7/0041; H04L 12/40013; H04L 2012/40215
See application file for complete search history.

(56) References Cited

U.S. PATENT DOCUMENTS

| | | | |
|---|---|---|---|
| 9,606,948 B2 | 3/2017 | Monroe et al. | |
| 9,973,348 B2 | 5/2018 | Mounier et al. | |
| 2017/0070366 A1 | 3/2017 | Hehemann et al. | |
| 2018/0121385 A1 | 5/2018 | Segarra et al. | |
| 2019/0288886 A1* | 9/2019 | Mangst | H04L 25/4917 |

FOREIGN PATENT DOCUMENTS

DE    102017205785 A1    10/2018

OTHER PUBLICATIONS

Hiroyuki Mori et al., Novel Receiver Circuit to Achieve Higher Data Rates in a Linear Passive Star CAN, 2013 International Symposium on Electromagnetic Compatibility, Sep. 2-6, 2013, pp. 910-915, IEEE, Brugge, Belgium.

* cited by examiner

*Primary Examiner* — Kabir A Timory
(74) *Attorney, Agent, or Firm* — Joshua M. Haines

(57) ABSTRACT

A CAN transceiver includes a first terminal which receives a transmit signal from a CAN microcontroller. A splitter unit transmits a signal derived from the transmit signal to a CAN bus a via bus connection. A unit receives signals from the CAN bus via the bus connection. A second terminal sends a receive signal derived from the received signals to the CAN microcontroller. The transmit and receive signals include a pulsed signal waveform which represents data bits. Delay circuits apply a deliberate delay to the rising or falling edge of pulses of the transmit signal and/or a deliberate delay to the rising or falling edge of pulses of the receive signal.

8 Claims, 4 Drawing Sheets

ADAPTABLE CAN TRANSCEIVER AND SYSTEM

TECHNICAL FIELD OF INVENTION

This invention relates to controller area network (CAN) transceivers and CAN systems.

BACKGROUND OF INVENTION

A controller area network (CAN) is a communication bus, communication standard, and set of hardware used in vehicles which allows multiple separate nodes to communicate with one another. The CAN transceiver is the interface circuit that connects the CAN bus with the CAN microcontroller or microprocessor (μC/μP).

A CAN bus has CAN high (CANH) and CAN low (CANL) nodes or lines. The difference in voltage between these two lines (Vdiff)=CANH−CANL and this determines the state of the bus. Vdiff>0.9V is defined as a dominant (DOM) state. Vdiff<0.5V is defined as a recessive (REC) state.

The transceiver receives a digital signal from the μC through its CANTXD input pin. The transceiver transmits this signal onto the bus through a transmit circuit and observes the state of the bus through a receiver circuit which then sends a signal back to the μC through the CANRXD output pin. The state of CANTXD and CANRXD are defined as DOM if they are logic 0 and are defined as REC if they are a logic 1. Data is transmitted by transmitting a series of bits via a signal comprising a series of pulses, where high state represents a logic "1" (REC) and low state a logic "0" (DOM).

CAN communication speeds are limited by the capabilities of the CAN bus and CAN transceiver. ISO 11898-2 standardizes hardware bit timing requirements for CAN transceivers for flexible data (CAN FD) rates up to 5 MB/S. Specifically, ISO 11898-2 defines the allowed minimum and maximum width of a single REC state on the bus (Tbit(bus)), at the transceiver CANRXD pin (Tbit(rxd)), and the symmetry of these two parameters (dTrec=Tbit(rxd)−Tbit(bus)). These parameters are a function of CAN data rates and will therefore have to be changed when CAN data rates inevitably increase beyond 5 MB/S. Therefore, transceiver hardware must continually evolve with increasing CAN data rates since the requirements for higher date rates are not standardized in advance.

Complicating the problem is that wave-shaping of CANH and CANL bus slew on and slew off is required to meet electromagnetic compatibility (EMC) requirements. EMC requirements must be met regardless of the data rate. Wave-shaping slows down the Vdiff transitions and therefore impacts bit timing as the data rate increases.

Furthermore, advanced CAN transceivers are now defined by international standards and are available which are capable of processing CAN bus messages for the purpose of selective wakeup on frame (WUF) or so called partial networking (PN) CAN. Bit timing requirements must be met within the transceiver for it to correctly read CAN frames on the bus.

Tbit(bus), Tbit(rxd), dTrec, and wave-shaping can each independently vary with temperature and manufacturing process making it difficult to optimize all parameters with a single fixed design methodology. Furthermore, Tbit(bus), Tbit(rxd), and dTrec are defined by international standards organizations and are therefore only presently defined for existing CAN data rates. Future CAN data rates will require unknown Tbit(bus), Tbit(rxd), and dTrec parameters making it impossible for transceivers with a fixed (un-trimmable) design solution to adapt to changing standards.

U.S. Pat. No. 9,606,948B2 "CAN bus edge timing control for dominant-to-recessive transitions" describes a circuit for speeding up the DOM to REC transitions by actively driving the bus recessive as opposed to letting the bus decay through the RC bus load as is usually the case for CAN transceivers. U.S. Pat. No. 9,973,348B2 "Transceiver circuit and method for controller are networks" describes a circuit for selectively speeding up DOM to REC transitions when flexible data rates are present. U.S. Pat. Nos. 9,606,948B2 and 9,973,348B2 can reduce Tbit(bus) and Tbit(rxd) by the same value but cannot increase these parameters and cannot independently adjust these parameters. Furthermore, the solution inherently couples wave-shaping with bit timing parameters and therefore fails to meet the required solution.

It is an object of the invention to provide a CAN system which overcomes these problems. It is further an object to provide such a system which has which has flexibility in the selectivity of Tbit(bus), Tbit(rxd),

SUMMARY OF THE INVENTION

In one aspect is provided a CAN transceiver including:
first terminal means adapted to receive a transmit signal (CANTXD) from a CAN microcontroller;
means to subsequently transmit signal(s) derived from said transmit signal to a CAN bus via bus connection means;
means to receive signals from a CAN bus via bus connection means: and second terminal means adapted to send a receive signal (CANRXD) derived from said received signals to said CAN microcontroller;
wherein said transmit and receive signals comprise a pulsed signal waveform said pulses representing data bits;
further including:
means to apply a deliberate delay to the rising or falling edge of pulses of said transmit signal and/or means to apply a deliberate delay to the rising or falling edge of pulses of said receive signal.

Pulses of single bit duration transmitted to said bus have a width of Tbit (bus) and said means to means to apply a deliberate delay to the rising or falling edge of pulses of said transmit signal may provide variation in said width.

Means to apply a deliberate delay to the rising or falling edge of pulses of said transmit signal and means to apply a deliberate delay to the rising or falling edge of pulses of said receive signal may comprise;
means to apply a delay to the rising edge of pulses of said transmit signal and means to apply a corresponding delay to the falling edge of pulses of the receive signal Means to apply a deliberate delay to the rising or falling edge of pulses of said transmit signal and means to apply a deliberate delay to the rising or falling edge of pulses of said receive signal may comprise:
means to apply a delay to the falling edge of pulses of said transmit signal and means to apply a corresponding delay to the rising edge of pulses of the receive signal Said delays may be trimmable Said pulses to which delays are applied to said rising or falling edges may be nominal REC (1) pulses in a CAN protocol system.

Said transceiver may have means to logically combine CANH and CANL signals from the bus form a signal for transmission to said second (CANRXD) terminal.

In a further aspect is provided a CAN system comprising a plurality of CAN units, connected with each other via common CAN bus; wherein each CAN unit comprising CAN microcontroller and a CAN transceiver as claimed in any previous claim, said CAN transceiver connected between said respective CAN unit and said common CAN bus.

In another aspect is provided, in a CAN system comprising a first CAN unit connected to a second CAN unit via common CAN bus; wherein each CAN unit comprises CAN microcontroller and a CAN transceiver, said CAN transceiver connected between said respective CAN unit and said common CAN bus; said transceiver adapted for transmission of data to and from said CAN units, a method of transmitting data from a said first CAN unit to said second CAN unit comprising:

a) receiving a signal from said first CAN microcontroller at said first transceiver, said signal comprising a series of pulses representing data for transmission to said second CAN unit via said CAN bus;
b) applying a deliberate delay in said first transceiver to either the rising or falling edge of said pulses to provide a modified signal;
c) transmitting a signal(s) derived from the said modified signal via said CAN bus to said second CAN unit;
d) receiving said transmitted signal of c) by said second transceiver and providing a receive signal comprising a series of pulses representing said data;
e) applying a corresponding deliberate delay to either the rising or falling edge of said pulses of said received signal to provide a modified receive signal;
f) transmitting the modified receive signal to said second CAN microcontroller.

The delays may be trimmable.

Step b) may comprises applying a deliberate delay in said first transceiver to the rising edge of said pulses to provide a modified signal; and step e) may comprise applying a corresponding deliberate delay to the falling edge of said pulses of said received signal to provide a modified receive signal.

Step b) may comprises applying a deliberate delay in said first transceiver to the falling edge of said pulses to provide a modified signal; and step e) may comprise applying a corresponding deliberate delay to the rising edge of said pulses of said received signal to provide a modified receive signal.

The bus connection means may comprise CANH and CANL connections.

Reference to a pulsed signal waveform said pulses representing data bits, refers to bit sequence comprises of pulses with high and low states representing logical e.g. "1" or "0";

The term "corresponding" with respect to the delay means they are preferably of the same duration.

BRIEF DESCRIPTION OF DRAWINGS

The present invention is now described by way of example with reference to the accompanying drawings in which.

DETAILED DESCRIPTION OF INVENTION

In one aspect is provided a system and method which allows for varying the parameters of Tbit(bus), Tbit(rxd), and dTrec.

The method can be applied to existing transceivers if required to meet updated bit timing specifications. The method/circuit provided for changing Tbit(bus), Tbit(rxd), and dTrec, is independent of optimizing for wave-shaping.

Some aspects of the invention provide for changing Tbit(bus), Tbit(rxd), and dTrec for existing transceiver hardware if bit timing specifications are changed and further allows Tbit(bus), Tbit(rxd), and dTrec to be changed in the field.

Aspects of the invention allow optimization of wave-shaping by controlling the slew on (rising edge) and slew off (falling edge) CANH and CANL waveforms, and then independently trimming in bit timing requirements. This is achieved by applying deliberate delays to the rising and falling edges of pulses of outgoing and incoming signals (CANTXD, CANRXD); such delays can be variable so that the delays and thus Tbit(bus), Tbit(rxd), and dTrec are trimmable.

Furthermore, the bit timing parameters can be adjustable for existing transceiver hardware in order to meet changing specifications for existing or future data rates and the adjustments must be possible in the field after the transceivers have left the manufacturer and are incorporated into hardware in the vehicle.

The problem of independent control of CAN bit timing and wave-shaping within the CAN transceiver itself (i.e. changing the Tbit(bus), Tbit(rxd), is solved by the applying selective delays to pulses of the signal output from the μC/μP on the CANTXD line which are subsequently transmitted to the CAN bus and/or applying selective delays to the pulses received signal input from the CAN bus and subsequently output from the μC/μP on the CANRXD line or pin. The application of these delays (which are to rising/falling edges of data pulses) may be provided within the transceiver by e.g. the addition of one or more delay circuits. These are preferably trimmable so that the transceivers can be changed either at the manufacturer or in the field, so as to e.g. alter Tbit(bus), Tbit(rxd).

Thus, in one aspect is provided novel circuit that is used as part of a CAN transceiver. The circuit enables trimming of Tbit(bus), Tbit(rxd), and thus dTrec to be varied in order to optimize performance to meet high speed flexible data rate standards.

BACKGROUND

Figure 1:
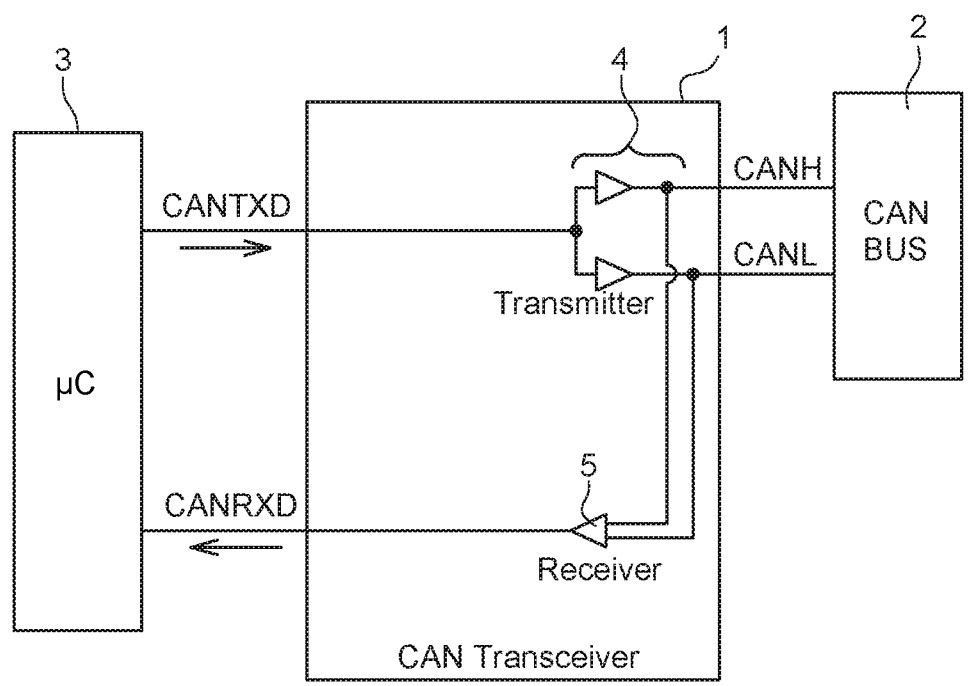
FIG. 1 shows a block diagram of a conventional CAN transceiver connected to a CAN bus.

FIG. 1 shows a block diagram of a standard CAN transceiver 1 connected to a CAN bus 2. A microprocessor (alternatively referred to as a microcontroller) for the CAN unit 3 has an output line (CANTXD) where bits can be output to the CAN bus from the microprocessor via the CANTXD input pin of the CAN transceiver 1. Bits or high/low state can be transmitted onto both the CANH and CANL lines of the bus via a splitter unit 4; shown schematically in the right portion of the transceiver.

Also, the CAN transceiver 1 allows bits from the CANH and CANL lines to be sent to the microprocessor via the transceiver on a CANRXD line from CANRXD output pin of the CAN transceiver 1. Input from the CANH and CANL lines are logically processed at a unit 5 to detect whether the CAN line is DOM (0) or REC (1) e.g., by determining Vdiff.

Definitions

The width of a single REC (bit) state on the bus, i.e. the time the bus is REC (bit), is referred to as Tbit(bus).

The width of a single REC state at the transceiver CAN-RXD line or pin is Tbit(rxd).

The difference between these two parameters which is a measure of the symmetry is dTrec=Tbit(rxd)−Tbit(bus).

Figure 2:
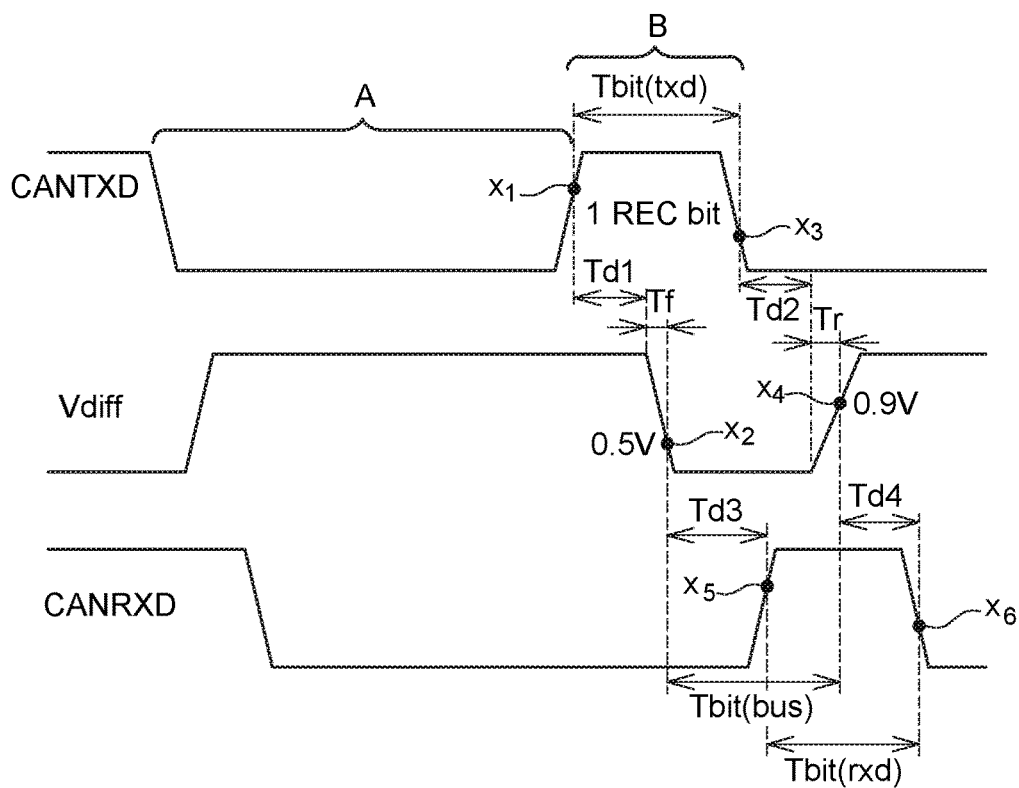
FIG. 2 shows a bit timing diagram of appropriate signals of CANTXD, Vdiff and CANRXD.

FIG. 2 shows a bit timing diagram; i.e. a timing diagram of appropriate signals as indicated. The top plot shows the signal transmitted from the microcontroller to the transceiver via the CANTXD pin of the transceiver. The middle plot shows Vdiff which is the logical data signal on the CAN bus, and the bottom plot shows the subsequently received signal to be transmitted via the CANRXD terminal. During a time period designated generally by A, the CANTXD is in a DOM (low state) for a data period equivalent to 5 bits, and subsequently a single REC bit "1" of high state is transmitted during time generally designated with arrow B. So here then a single (REC) bit is transmitted along the CANTXD line to the CAN bus.

The CANTXD voltage output from the microprocessor for this REC bit thus results in a rising edge (slope)/slew on and at point x1 reaches a level where it is nominally a "1" (REC) level to initiate change of state of the CAN bus. There is an inherent delay Td1 before the Vdiff level starts to change state; further there is a delay Tf because of the slope of the Vdiff signal, before point x2 is reached which is the Vdiff level falls to the nominal (low) level of a change of state.

Only at point x2 does this occur where it recognized on CANRXD of transceivers lines so that they can start to change the state on the lines.

At point x3, on the CANTXD line the nominally REC (1) goes down to the low voltage value where the CANTXD bit line is nominally changes back down to a "0" (DOM) state. The time between point x1 and x3 is thus the Tbit (Txd).

Vdiff responds to the CANTXD change of state from REC to DOM at point X3 after a delay Td2. A further delay Tr for change of slope is required for Vdiff to reach the nominal voltage level of the changed state ("0" to "1"). Vdiff goes to the changed state (nominally high) at point x4. Tbit(bus) is thus the time between x4 and x2.

CANRXD changes from DOM to REC at point x5 in response to the change of state of Vdiff at point x2 after a delay Td3. CANRXD changes from REC to DOM at point x6 in response to the change of state of Vdiff at point x4 after a delay Td4.

Tbit(bus) is defined according to the equation below:

$$Tbit(bus)=x4-x2=Tbit(txd)-Td1-Tf+Td2+Tr \text{ where}$$

Td1 delay from CANTXD REC edge to start of falling Vdiff;
Tf time for Vdiff to fall to 0.5V;
Td2 delay from CANTXD DOM edge to start of rising Vdiff
Tr time for Vdiff to rise to 0.9V; and
Tbit(txd) is the width of CANTXD bit as sent from μC (x3−x1).

Tbit(rxd) is defined as follows:

$$Tbit(rxd)=x6-x5=Tbit(bus)-Td3+Td4 \text{ where}$$

Td3 delay from Vdiff=0.5V to CANRXD REC edge; and
Td4 delay from Vdiff=0.9V to CANRXD DOM edge.

Tr and Tf are delays to slew the bus on and off and are set in order to achieve wave-shaping requirements for EMC. Td1 through Td4 are propagation delays that are independent of Tr and Tf and are therefore independent of wave-shaping.

DETAILED ASPECT OF THE INVENTION

In aspects of the invention is provided method and circuitry to independently increase or decrease either Tbit(bus) and/or Tbit(rxd) by applying delays to appropriate signals. This can be regarded as increasing selective delays to one or more of Td1, Td2, Td3 or Td4.

Example 1

Figure 3:
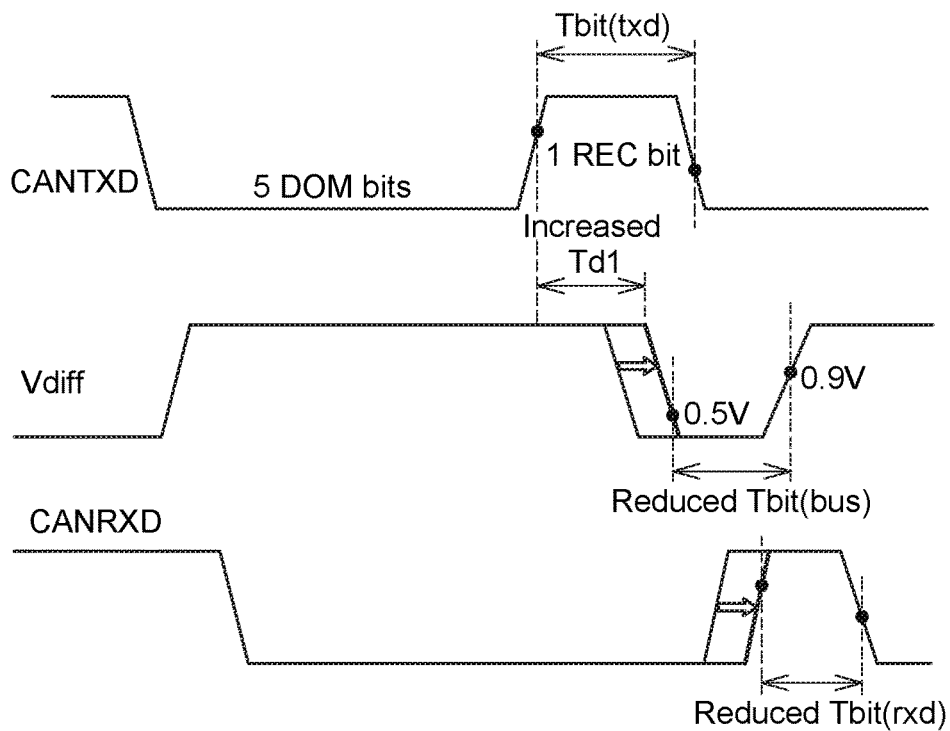
FIG. 3 shows a figure similar to FIG. 2 which shows the effect of increasing a delay Td1.

Tbit(bus) can be deliberately reduced by increasing Td1, as indicated by the thick arrow in FIG. 3 on the signal for Vdiff and CANRXD. FIG. 3 is the same as FIG. 2 but shows the effect of applying a delay to Td1.

Tbit(rxd) is unavoidably reduced by the reduction of Tbit(bus) but can be rectified/corrected by appropriate adjustment of Td4 which will be described later.

Example 2

Figure 4:
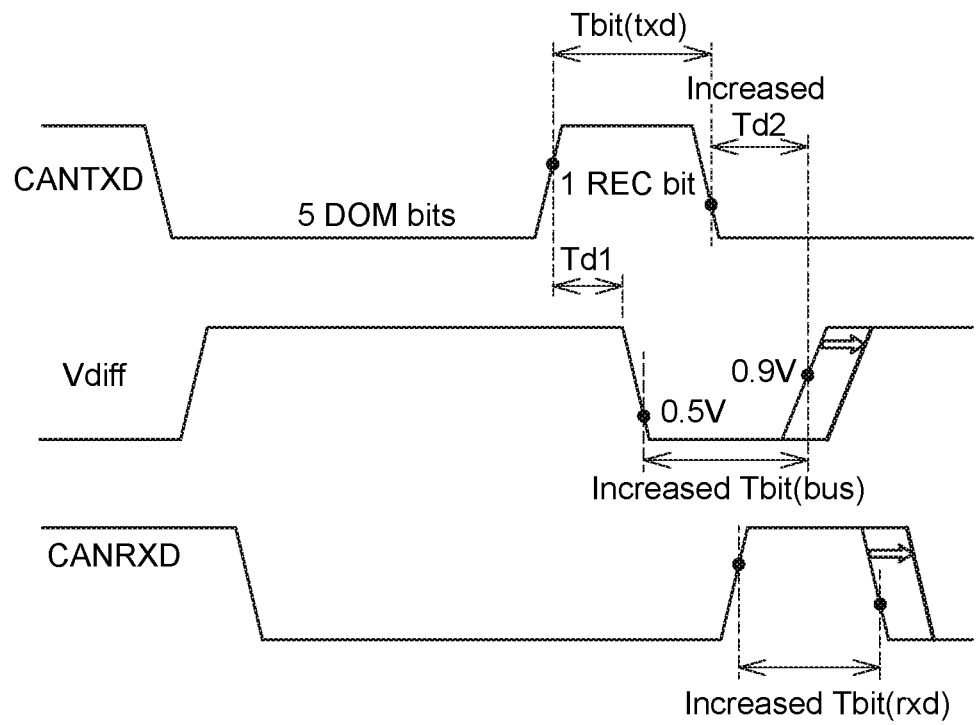
FIG. 4 shows a figure similar to FIG. 2 which shows the effect of increasing a delay Td2.

Tbit(bus) is deliberately increased by applying a delay to deliberately increase Td2 as shown in FIG. 4. The large arrow shows the effect of the increase of delay Td2 on Vdiff. This unavoidably increases Tbit(rxd) but this can be corrected by increasing Td3 as is explained below.

Example 3

Figure 5:
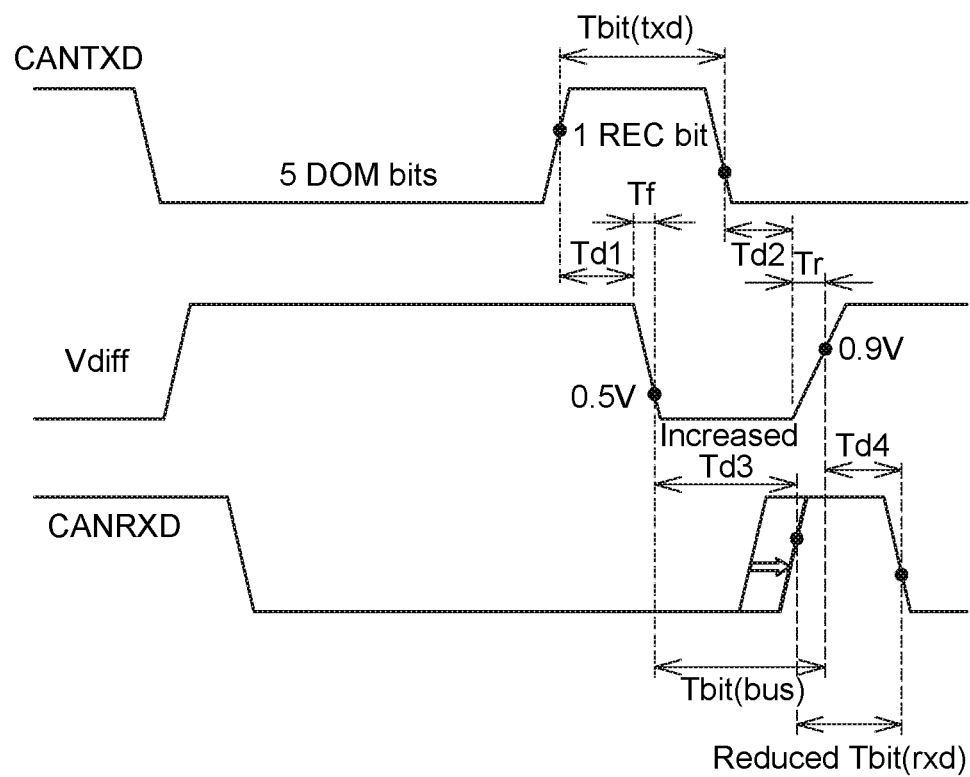
FIG. 5 shows a figure similar to FIG. 2 which shows the effect of increasing a delay Td3.

Tbit(rxd) can be decreased by increasing Td3 by applying a delay as shown in FIG. 5. The large arrow shows the effect of the resultant increase of delay Td3. There is no impact on Tbit (bus)

Example 4

Figure 6:
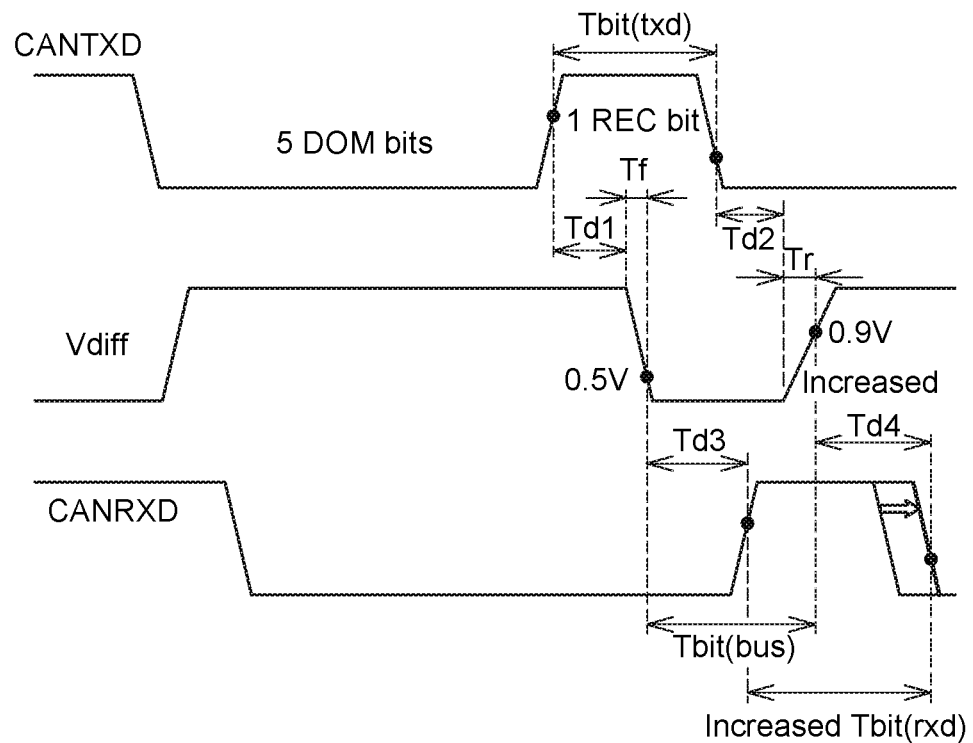
FIG. 6 shows a figure similar to FIG. 2 which shows the effect of increasing a delay Td4.

Tbit(rxd) can be increased by increasing Td4 by applying a deliberate delay as shown in FIG. 6. The large arrow shows the increase of delay Td4. There is no impact on Tbit (bus).

Figure 7:
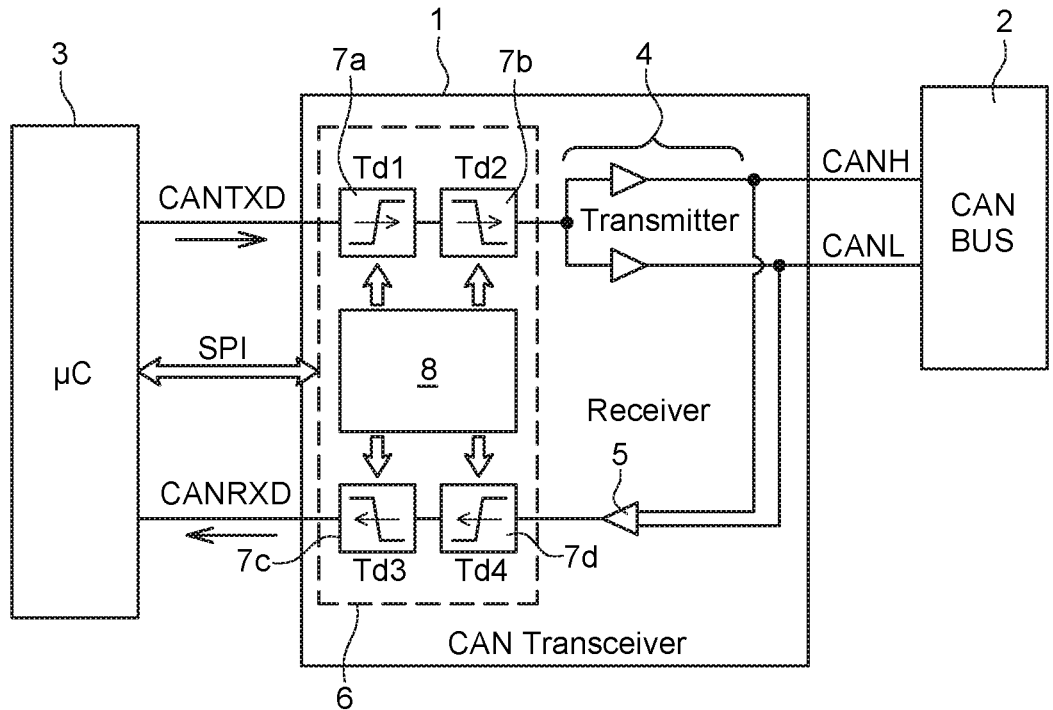
FIG. 7 shows circuitry which may be used to implement one or more aspects of the invention.

FIG. 7 shows circuitry which may be used to implement one or more aspects of the invention. The figure is similar to FIG. 1 and like components have like reference numerals. Here, additional circuitry shown in block 6 is embodied in the CAN transceiver 1 which includes one or more delay circuits 7a, 7b, 7c, and 7d which have the function of applying deliberate (additional to inherent delays) delays to the rising and falling edge of pulses from the CANTXD line (Td1 and Td2 respectively) and to the rising and falling edges of the pulses transmitted/forwarded to the CANRXD pin (Td3 and Td4 respectively).

So, the delay circuits 7a and 7b can apply delays to the signal on the CANTXD line from the μC subsequently output to the CAN bus which allow increase to delays Td1 and Td2 respectively on the rising and falling edge of the REC bit respectively.

Delay circuits 7c and 7d apply delays to the rising and falling edge signals received by the CAN transceiver 1 from the CAN bus 2 (or to the combined signal from the CAN bus 2 which is subsequently output to the μC on the CANRXD line), which allow increase to delays Td3 and Td4 respectively on the rising and falling edge of the received REC bit respectively.

The delays may be adjustable/trimmable. The figure shows the four independent delay circuits 7a, 7b, 7c, 7d but the skilled person would be aware that in order to carry out aspects of the invention, not all of these are required. The programmed delay values for these delay circuits in the example are stored in registers 8 within the CAN transceiver 1 that can be, optionally, updated by means of a SPI (serial peripheral interface) connection.

In examples the skilled person would be aware that any given transceiver, in practice, will only require that two out of the four delay circuits be used to adjust the bit timing parameters. With the internal delay circuit for Td1 to Td4 set to 0 delay by default, Tbit(bus) will either be too short or too long (not both). Thus, either Td1 or Td2 will need to be increased in order to trim in Tbit(bus) into specification. Once Tbit(bus) has been trimmed into specification, then Tbit(rxd) will either be too short or too long, and therefore either Td3 or Td4 will need to be increased to trim in Tbit(rxd). dTrec will then be in specification by definition, since dTrec=Tbit(rxd)−Tbit(bus).

Delay circuits can either be analog or digital in nature but would have sufficient resolution to allow for fine adjustment of Tbit(bus), Tbit(rxd), and dTrec.

The method allows control of the transmit and receive path delays which is independent of wave-shaping delays for a CAN transceiver and is a method of adjusting bit timing parameters to meet evolving specifications, either at the manufacturer or in the field.

The method allows independent optimization of bit timing and wave-shaping for CAN transceivers. CANTXD bit width could be narrowed or widened in a sufficiently capable µC prior to being sent to the transceiver/transmission but the µC cannot measure Tbit(bus) so this procedure cannot be used to trim Tbit(bus) into specification. Similarly, the µC could adjust the width of CANRXD that it observes from the transceiver in order to correct Tbit(rxd) but this does not correct the observed CANRXD signal within a PN CAN transceiver which must meet bit timing specifications even prior to sending CANRXD data to the µC for the purpose of selective wake up. As a result, adjustments to CANTXD and CANRXD within the µC will not address the deficiencies of prior art.

The present invention allows for control of Tbit(bus), Tbit(rxd), and dTrec at the manufacturer or in the field in a manner that is independent of control over wave-shaping.

I claim:

1. A controller area network (CAN) transceiver including:
   a first terminal adapted to receive a transmit signal from a CAN microcontroller;
   means to subsequently transmit signals derived from said transmit signal to a CAN bus via a bus connection;
   means to receive signals from said CAN bus via said bus connection
   a second terminal adapted to send a receive signal derived from said signals received from said CAN bus to said CAN microcontroller;
   wherein said transmit and receive signals comprise a pulsed signal waveform, said pulsed signal waveform representing data bits; and
   means which 1) applies a deliberate delay to a rising edge or to a falling edge of pulses of said transmit signal, thereby changing a width of said pulses of said transmit signal and 2) applies a second deliberate delay, consequent to said deliberate delay applied to said rising edge or to said falling edge of pulses of said transmit signal, to a rising edge or to a falling edge of said receive signal of pulses of said receive signal, thereby changing a width of said pulses of said receive signal.

2. The CAN transceiver as claimed in claim 1 where pulses of single bit duration transmitted to said CAN bus have a width of Tbit (bus) and said means which applies said first and second deliberate delays provides variation in said width.

3. The CAN transceiver as claimed in claim 1 wherein, said means which applies a deliberate delay comprises;
   means to apply a deliberate delay to the rising edge of the pulses of said transmit signal and means to apply a corresponding deliberate delay to the rising edge of the receive signal consequent to the falling edge of the pulses of the receive signal.

4. The CAN transceiver as claimed in claim 1, wherein said means which applies a deliberate delay comprises:
   means to apply a delay to the falling edge of pulses of said transmit signal and means to apply a corresponding delay to the falling edge of receive signal consequent to the rising edge of the pulses of the receive signal.

5. The CAN transceiver as claimed in claim 1, wherein said deliberate delays are trimmable.

6. The CAN transceiver as claimed in claim 1 where said pulses to which said deliberate delays are applied to said rising or falling edges are nominal recessive (REC) pulses in a CAN protocol system.

7. The CAN transceiver as claimed in claim 1 having means to logically combine CANH and CANL signals from the CAN bus form a signal for transmission to said second (CANRXD) terminal.

8. The CAN system comprising a plurality of CAN units, connected with each other via a common CAN bus; wherein each of the plurality of CAN units comprises a CAN microcontroller and a CAN transceiver as claimed in claim 1, said CAN transceiver of each of said plurality of CAN units being connected to said common CAN bus.

* * * * *